UNITED STATES PATENT OFFICE.

GEORGE H. WOOSTER, OF NEW YORK, N. Y.

MATERIAL FOR THE TREATMENT OF WALLS.

SPECIFICATION forming part of Letters Patent No. 397,529, dated February 12, 1889.

Application filed May 10, 1888. Serial No. 273,507. (No specimens.)

*To all whom it may concern:*

Be it known that I, GEORGE H. WOOSTER, a resident of New York, county of New York, and State of New York, have made a new and useful Improvement in Materials for the Treatment of Walls, of which the following is a specification.

The common practice in finishing an interior wall of a house is to apply first to the lathing a coat of sand, lime, and cow's hair mixed together, which combination is allowed to dry on the wall until it becomes hard. Prior to its complete drying the coat is usually scratched or roughened on the surface to facilitate the adherence of the second coat. It will be observed that the first coat is composed of materials which do not "set," but which harden merely by the process of drying. The second coat, which is usually applied to the wall, is placed upon the first coat after it is dry, and is composed of the same materials that were used in the first coat, or lime and sand are used. This coat, however, is laid on with a smooth surface finish, and is not scratched or scored. Sometimes a little plaster is mixed with the materials to make them harden quicker. After the second coat has dried the final coat of hard finish, either as a polished or roughened surface, is applied, and the wall is thus completed. This operation requires time, as the first two coats dry merely by loosening or evaporating water, as mud or like material would dry, and this comparatively is a slow and tedious process.

My invention consists in a new composition of matter with which walls can be prepared very rapidly.

The gist of my invention lies in preparing or combining dried sand or like materials with calcined plaster and a carbonate or hydrate of lime for sale in bulk or by the barrel, suitable to be used by mixing with water, and afterward to be applied to walls or ceilings of buildings and like purposes, which will form a coat which will set and harden in a few hours, instead of forming a primary coat out of materials which harden by the process of evaporation or drying alone, such processes requiring days or weeks to dry, according to the humidity of the atmosphere.

In making my new material I proceed as follows: I dry white or brown sand, if there be any moisture in it, before it is mixed with the plaster, either in the sun or preferably in a jacketed kettle or the like, and then mix the dry sand and the plaster in about the following proportions: about one-half sand and one-half plaster, by bulk. Of course a greater or less amount of sand may be used in accordance with the requirements of the case. The object in drying the sand is to prevent any moisture that it might contain from causing the plaster to set. After the dried sand and the powdered plaster are thoroughly mixed or commingled, I put it in barrels and sell it to those who wish to finish walls and buildings.

In treating a wall all that is necessary for a builder to do is to open the barrel, mix water with the sand and plaster until the mass is sufficiently plastic, and then at once apply it to the lathing of the wall or partition, where it will very rapidly set and make a firm, dry, and durable support for the consequent coat or coats.

I prefer to apply the final coat directly on the primary coat after the same has set; but I need not necessarily so proceed in practice.

By the use of my compound a durable result is obtained, while at the same time the operations can be conducted with a great saving of time and with little trouble. By using the materials herein described a house could be plastered with a primary coat, which will be ready for the application of the final coat in a few hours, and when a final coat—such as described in my application No. 292,817, filed December 6, 1888—is used both can be applied and finished in above twelve hours.

To strengthen the compound before described, I combine it with calcined ground marble, carbonate of lime, ground lime, air-slaked lime, or other equivalent material which are carbonates or hydrates of lime. When calcined ground marble is desired, it may be mixed uncalcined with uncalcined gypsum and both calcined together in the same kettle, or calcined and mixed afterward. The best proportions that I have found is about one-tenth, in bulk, of lime to nine-tenths of plaster and sand; but a greater or less proportion of lime may be used.

One great advantage of mixing the calcined carbonate or hydrate of lime with the other materials before mentioned is that it prevents the mass from shrinking when used for patching, filling cracks, &c., and also from cracking from the corners in a completed wall. It also tends to make the plaster harder when fully set.

Having thus described my invention, what I claim, and desire to secure by Letters Patent, is—

The herein-described composition of matter, comprising a prepared mixture of sand heated or dried, plaster-of-paris, and a carbonate or hydrate of lime, substantially as described.

GEO. H. WOOSTER.

Witnesses:
JOSEPH L. LEVY,
W. T. B. MILLIKEN.